United States Patent
Cherkouk et al.

(10) Patent No.: US 11,355,749 B2
(45) Date of Patent: Jun. 7, 2022

(54) METHOD FOR PRODUCING SILICON-BASED ANODES FOR SECONDARY BATTERIES

(71) Applicants: ROVAK GmbH, Grumbach (DE); Technische Universitaet Bergakademie Freiberg, Freiberg (DE); Helmholtz-Zentrum Dresden-Rossendorf e.V., Dresden (DE)

(72) Inventors: Charaf Cherkouk, Dresden (DE); Dirk C. Meyer, Dresden (DE); Tilmann Leisegang, Dresden (DE); Teresa Orellana Perez, Freiberg (DE); Slawomir Prucnal, Dresden (DE); Wolfgang Skorupa, Dresden (DE)

(73) Assignees: ROV AK GmbH, Grumbach (DE); Technische Universitaet Bergakademie Freiberg, Freiberg (DE); Helmholtz-Zentrum Dresden Rossendorf e.V., Dresden (DE)

( * ) Notice: Subject to any disclaimer, the term of this patent is extended or adjusted under 35 U.S.C. 154(b) by 454 days.

(21) Appl. No.: 16/077,963

(22) PCT Filed: Feb. 10, 2017

(86) PCT No.: PCT/EP2017/052956
§ 371 (c)(1),
(2) Date: Aug. 14, 2018

(87) PCT Pub. No.: WO2017/140581
PCT Pub. Date: Aug. 24, 2017

(65) Prior Publication Data
US 2020/0395608 A1    Dec. 17, 2020

(30) Foreign Application Priority Data
Feb. 15, 2016   (DE) .................. 10 2016 001 949.2

(51) Int. Cl.
    *H01M 4/38*    (2006.01)
    *H01M 4/04*    (2006.01)
    *H01M 4/134*   (2010.01)

(52) U.S. Cl.
    CPC ......... *H01M 4/386* (2013.01); *H01M 4/0409* (2013.01); *H01M 4/0471* (2013.01); *H01M 4/134* (2013.01)

(58) Field of Classification Search
    CPC .. H01M 4/386; H01M 4/0409; H01M 4/0471; H01M 4/134; H01M 4/0421; H01M 10/052; Y02E 60/10
    See application file for complete search history.

(56) References Cited

U.S. PATENT DOCUMENTS

| 6,566,277 B1 | 5/2003 | Nakagawa et al. |
| 8,470,632 B2 | 6/2013 | Stuetzel et al. |
| (Continued) | | |

FOREIGN PATENT DOCUMENTS

| CN | 1290959 A | 4/2001 |
| CN | 101111925 A | 1/2008 |
| (Continued) | | |

OTHER PUBLICATIONS

R.S. Morris, B.G. Dixon, T. Gennett, R. Raffaelle, M.J. Heben: High-energy, rechargeable Li-ion battery based on carbon nanotube technology, J. of Power Sources, 138, 277 (2004).

(Continued)

*Primary Examiner* — Matthew T Martin
*Assistant Examiner* — Adam J Francis
(74) *Attorney, Agent, or Firm* — Collard & Roe, P.C.

(57) ABSTRACT

A method for producing silicon-based anodes for secondary batteries carries out the following steps for producing an anode: —depositing a silicon layer on a metal substrate having grain boundaries, wherein the silicon layer has a first (Continued)

boundary surface directed towards the metal substrate, —heating the metal substrate using a heating unit to a temperature between 200° C. and 1000° C., —conditioning the region of the second boundary surface of the silicon layer that is facing away from the metal substrate using an energy-intensive irradiation during the heating, —generating polyphases in the region of the silicon layer and the metal substrate, made up of amorphous silicon and/or crystalline silicon of the silicon of the silicon layer and of crystalline metal of the metal substrate and of silicide and—generating crystalline metal of the metal substrate.

6 Claims, 5 Drawing Sheets

(56) References Cited

U.S. PATENT DOCUMENTS

| | | | |
|---|---|---|---|
| 2004/0023106 A1* | 2/2004 | Benson | H01M 6/187 429/122 |
| 2009/0061319 A1* | 3/2009 | Kim | H01M 4/366 429/220 |
| 2011/0108108 A1* | 5/2011 | Im | H01L 21/02667 136/258 |
| 2011/0254128 A1 | 10/2011 | Kuriki et al. | |
| 2012/0070741 A1 | 3/2012 | Liu et al. | |
| 2014/0162129 A1* | 6/2014 | Kim | H01M 4/0419 429/231.8 |
| 2014/0370386 A1 | 12/2014 | Hirono et al. | |

FOREIGN PATENT DOCUMENTS

| | | |
|---|---|---|
| CN | 101789388 A | 7/2010 |
| CN | 101971293 A | 2/2011 |
| CN | 102080244 A | 6/2011 |
| CN | 102668036 A | 9/2012 |
| WO | 2012/158608 A1 | 11/2012 |
| WO | 2015/021368 A1 | 2/2015 |

OTHER PUBLICATIONS

Z. Zhou, J.J. Zhao, X.P. Gao, Z. F. Chen, J.Yan, P.V. Schiever, M. Morinaga: Do Composite Single-Walled Nanotubes Have Enhanced Capability for Lithium Storage?, Chem. Mater., 17, 992 (2005).

M. Green, E. Fielder, B. Scrosati, M. Wachtler and J. S. Moreno: Structured Silicon Anodes for Lithium Battery Applications, Electrochem. Solid-State Lett, 6, A75-A79 (2003).

T. Song, J. Xia, J.-H. Lee, D. H. Lee, M.-S. Kwon, J.-M. Choi, J. Wu, S. K. Doo, H. Chang, W. I. Park, D. S. Zang, H. Kim, Y. Huang, K.-C. Hwang, J. A. Rogers and U. Paik: Arrays of Sealed Silicon Nanotubes as Anodes for Lithium Ion Batteries, Nano Lett., 10, 1710-1716 (2010).

A. S. Arico, P. Bruce, B. Scrosati, J.-M. Tarascon, W. Van Schalkwijk: Nanostructured materials for advanced energy conversion and storage devices, Nat. Mater., 4, 366 (2005).

M. Winter, J. O. Besenhard: Electrochemical lithiation of tin and tin-based intermetallics and composites, Electrochim. Acta, 45, 31 (1999).

J. Hassoun, S. Panero, B. Scrosati: Electrodeposited Ni-Sn intermetallic electrodes for advanced lithium ion batteries, J. of Power Sources, 160, 1336 (2006).

P. L. Taberna, S. Mitra, P. Piozot, P. Simon, J. M. Tarascon: High rate capabilities Fe3O4-based Cu nano-architectured electrodes for lithium-ion battery applications, Nat. Mater., 5, 567 (2006).

Z. M. Wang, J. Y. Wang, L. P. H. Jeurgens, E. J. Mittemeijer: Thermodynamics and mechanism of metal-induced crystallization in immiscible alloy systems: Experiments and calculations on Al/a-Ge and Al/a-Si bilayers, Physical Review B 77, 045424 (2008).

International Search Report of PCT/EP2017/052956, dated May 4, 2017.

M. R. Zamfir, H. T. Nguyen, E. Moyen, Y. H. Lee and D. Pribat: "Silicon nanowires for Li-based battery anodes: a review", Journal of Materials Chemistry A, 1, 9566 (2013).

* cited by examiner

METHOD FOR PRODUCING SILICON-BASED ANODES FOR SECONDARY BATTERIES

CROSS REFERENCE TO RELATED APPLICATIONS

This application is the National Stage of PCT/EP2017/052956 filed on Feb. 10, 2017, which claims priority under 35 U.S.C. § 119 of German Application No. 10 2016 001 949.2 filed on Feb. 15, 2016, the disclosure of which is incorporated by reference. The international application under PCT article 21(2) was not published in English.

BACKGROUND OF THE INVENTION

1. Field of the Invention

The invention relates to a method for the manufacture of silicon-based anodes for secondary batteries.

2. Description of the Related Art

The electrochemical energy storage is an important cornerstone of an energy revolution being fought worldwide to temporarily store the fluctuating, regeneratively produced electricity as well as to supply it for stationary and mobile applications. In order to combat a shortage related to raw materials and thus an increase in the costs for secondary batteries in particular, not only the diversification of the energy-storage concepts but also new materials are needed. This should improve the technical performance of corresponding energy storage concepts on the one hand (including capacity, energy density, useful life) and also minimize the manufacturing costs on the other hand. The latter may be ensured in particular by the use of readily available chemical elements, such as silicon represents, for which a broad technological basis already exists.

The choice of silicon as a promising and resource-efficient anode material is based on an algorithm that was developed in the course of the CryPhysConcept Project (BMBF: 03EK3029A): Besides electrochemical characterizing variables, it encompasses the questions of resource availability, of recycling and of costs—i.e. the criticality—as well as of environmental compatibility and operating safety, and it permits a weighting corresponding to a desired storage application.

Secondary batteries may be secondary-storage lithium batteries, which have the highest development dynamic with respect to broad applications such as in hearing aids, smart phones, laptops and as buffers for the energy grid and also as traction batteries for electric vehicles.

For the increased use of regenerative energies for the electromobility, traction batteries with up to several tens of kWh are additionally necessary for electric vehicles. Modern secondary storage systems, e.g. on the basis of lithium ion technology, are very well suited for the area of electromobility. However, the current storage density greatly limits the range of such electric vehicles. A further aspect relates not only to safety but also to the price disadvantage of electric cars due to the battery cells, which continue to be expensive. This is where inexpensive battery materials, for example for Si-based lithium cells, may contribute to an outstanding extent.

Silicon as an anode material has a high storage capacity of approximately 4212 mAhg$^{-1}$ at room temperature compared with the conventional carbon-type materials, such as graphite, for example, with a storage capacity of 372 mAhg$^{-1}$. However, challenges in the use of silicon as anode material arise with respect to the partly considerable volume change (volume contraction and expansion) of the host matrix during intercalation and deintercalation of the mobile ionic species during charging and discharging of corresponding energy storage systems. The volume change is approximately 10% for graphite but in contrast is approximately 400% for silicon. The volume change of the anode material during use of silicon leads to internal stresses, cracking, pulverization of the active material of the host matrix (silicon) and ultimately to complete destruction of the anode.

Selected scientific papers that can be associated with the method underlying the invention are indicated for silicon-based anodes in the following.

In the manufacture of batteries, carbon-based or silicon-based nanotubes and nanowires are already being used as anode materials in chargeable lithium batteries. The great advantage of such nanomaterials besides the increase of the speed of intercalation and deintercalation of the lithium is also the surface effect. A large surface increases the contact area for the electrolytes and the flow, associated therewith, of Li$^{+}$ ions (vacancies) through the interface, as is described in the publication of M. R. Zamfir, H. T. Nguyen, E. Moyen, Y. H. Lee and D. Pribat: Silicon nanowires for Li-based battery anodes: a review, Journal of Materials Chemistry A (a review), 1, 9566 (2013). Investigations on the carbon-based nanotubes and nanowires, which are described in the publications of R. S. Morris, B. G. Dixon, T. Gennett, R. Raffaelle, M. J. Heben: High-energy, rechargeable Li-ion battery based on carbon nanotube technology, J. of Power Sources, 138, 277 (2004) and Z. Zhou, J. J. Zhao, X. P. Gao, Z. F. Chen, J. Yan, P. V. Schiever, M. Morinaga: Do composite single-walled nanotubes have enhanced capability for lithium storage?, Chem. Mater., 17, 992 (2005), indeed show a better energy density (approximately 600 Wh/kg) in comparison with graphite, but during a charging process (at potentials of <100 mV vs. Li/Li$^{+}$) undergo the deposition of a reactive lithium layer, which is associated with a high safety risk. In contrast, silicon-based nanotubes and nanowires possess storage capacities of approximately 3400 mAhg$^{-1}$ that are indeed smaller compared with the theoretical values of 4212 mAhg$^{-1}$ of silicon, but exhibit more stable silicon structures in terms of the volume change of the silicon after the intercalation of the lithium up to a particular Si structure size, as is described in the publication of M. Green, E. Fielder, B. Scrosati, M. Wachtler and J. S. Moreno: Structured silicon anodes for lithium battery applications, Electrochem. Solid-State Lett, 6, A75-A79 (2003).

In general, the storage capacity depends on the discharge rate. For example, it follows from the publication: T. Song, J. Xia, J.-H. Lee, D. H. Lee, M.-S. Kwon, J.-M. Choi, J. Wu, S. K. Doo, H. Chang, W. I. Park, D. S. Zang, H. Kim, Y. Huang, K.-C. Hwang, J. A. Rogers and U. Paik: Arrays of sealed Silicon nanotubes as anode for lithium ion batteries, Nano Lett., 10, 1710-1716 (2010) that a reversible storage capacity of approximately 2600 mAhg$^{-1}$ or 2100 mAhg$^{-1}$ respectively with a cycling capability of more than 50 cycles has a discharge rate of C/20 or C/5 respectively as well as an improved axial or radial volume change of 35% or 120% respectively after the intercalation of the lithium.

Another example is likewise described in the publication of Song, Taeseup; Xia, Jianliang; Lee, Jin-Hyon; Lee, Dong Hyun; Kwon, Moon-Seok; Choi, Jae-Man et al.: Arrays of sealed silicon nanotubes as anode for lithium ion batteries, Nano Lett. 10 (5), S. 1710-1716 (2010), which shows that the densely packed Si-based nanotubes as arrays (30 nm-60 nm) are capable of drastically reducing the power losses of the anode material to less than 20% after 50 cycles at a discharge rate between C/20 and C/5.

Whereas the statements about capacity and volume change for the principle of the Si-based anodes differ, a consensus exists that the improvement of the power of the anode material as well as the reduction of the volume change are attributable to two kinds of reasons.

On the one hand, the free space between the nanostructures plays a key role in trapping the volume expansion in the material. On the other hand, the shrinkage of the structures contributes to facilitation of the occurring phase changes during the alloy formation, as is described in the publication of A. S. Arico, P. Bruce, B. Scrosati, J.-M. Tarascon, W. Van Schalkwijk: Nanostructured materials for advanced energy conversion and storage devices, Nat. Mater., 4, 366 (2005).

Nanoalloys are likewise very topical. The focus of the research efforts is the principle of enlargement of the free space between the nanostructures for absorption of the volume contraction and volume expansion, as is described in the publication of M. Winter, J. O. Besenhard: Electrochemical lithiation of tin and tin-based intermetallics and composites, Electrochim. Acta, 45, 31 (1999).

Corresponding experiments show that a cell voltage of 4 V and up to 50 cycles are achieved on a tin nanoalloy that possesses a capacity of 550 mAhg$^{-1}$, as is described in the publication of J. Hassoun, S. Panero, B. Scrosati: Electrodeposited Ni—Sn intermetallic electrodes for advanced lithium ion batteries, J. of Power Sources, 160, 1336 (2006). The anode behavior of tin (with a theoretical storage capacity of 993 mAhg$^{-1}$) is very similar to that of silicon in terms of the volume change. Even silicon nanocolumns exhibit an enormous decrease of the volume change with 80% of the total capacity after 100 cycles at a high discharge rate of 8C, as is described in the publication of P. L. Taberna, S. Mitra, P. Piozot, P. Simon, J. M. Tarascon: High rate capabilities $Fe_3O_4$-based Cu nano-architectured electrodes for lithium-ion battery applications, Nat. Mater., 5, 567 (2006).

The publication WO 2015021368 A1 describes an Li-ion battery that consists not only of an intercalation cathode but also of a porous Si anode coated on both sides with aluminum oxide by means of an atomic layer deposition (the English term, ALD). The aluminum oxide layer functions both as a passivation layer at the electrolyte/anode interface and as a contact face of the anode. Here, the volume change of the silicon after the intercalation of the lithium is circumvented by the fact that a protective layer is applied at the electrolyte/anode interface. The disadvantage consists in the fact that the poor electrical conductivity at the interface to the current collector has to be tolerated.

The publication WO 2012158608 A1 describes a method for the manufacture of an anode, based on an $SiO_x$/Si layer, for use in a Li ion battery. $SiO_x$/Si microparticles obtained by a laborious mechanical comminution by milling are introduced for the manufacture of the $SiO_x$/Si layer.

The publication US 2014/0370386 A1 describes a eutectic alloy of Si and at least one metallic element, e.g. Ti, V, Cr, Mn, Fe, Co, Ni, Cu, Zr or Nb, which is used for the production of microstructured Si alloys (structures smaller than 4 μm) that permit stable discharging/charging processes and a long useful life. An additional current lead of copper is needed.

SUMMARY OF THE INVENTION

An important aspect with regard to market penetration is not only safety but also the manufacturing costs. The conventional methods, associated with the prior art, for preparation of the described Si nanostructures are mostly wet-chemical, such as the sol-gel method or the electrolytic deposition among others, and in most cases they need a catalyst. This makes the manufacture of such anode materials cost-intensive.

The task underlying the invention is therefore to specify a method for the manufacture of silicon-based anodes for secondary batteries, which is suitably designed in such a way that an improvement is achieved from the economic perspective and from the technical perspective. The capacity should also be increased. Moreover, resources and energy as well as manufacturing time and costs should be considerably reduced. Furthermore, internal stresses within the Si anode material should be absorbed and the anode material should be capable of being scaled in flat manner over several orders of magnitude and of being completely integrated into roll-to-roll technology.

The task is accomplished by the features according to the invention. According to the invention, the method for the manufacture of silicon-based anodes for secondary batteries, wherein the secondary batteries consist at least of the anode, of at least one electrolyte, a separator and a counter-electrode, has the following steps:

depositing a silicon layer on a metal substrate, heating the metal substrate to a temperature between 200° C. and 1000° C., tempering the interface region of the silicon layer turned away from the metal surface by means of an energy-intensive treatment while the metal substrate is being heated, generating multiple phases in the region of the silicon layer and of the metal substrate, consisting of amorphous silicon and/or crystalline silicon of the silicon of the silicon layer and of crystalline metal of the metal substrate and of silicide.

An additional buffer layer or several additional buffer layers in the form of a metallic, oxidic, carbon-containing or polymer-containing layer may be introduced at one silicon-layer interface or at both Si-layer interfaces.

The tempering may be performed by means of an arrangement for rapid thermal treatment and annealing.

The metal substrate functions as an integrated current lead.

Nickel or copper, for example, may be used as the metal of the metal substrate.

The energy-intensive treatment and the process for annealing may be performed with an energy-intensive energy source, e.g. at least with a flash lamp that is capable of supplying a flash duration between 0.2 ms and 20 ms and an energy density of 0.6 J/cm$^2$ and 160 J/cm$^2$.

The silicon-based anode, which according to the aforesaid method can be manufactured for secondary batteries, comprises at least one metal substrate as carrier material and as current lead, a silicon layer deposited on a metal substrate, multiple phases of amorphous silicon, crystalline silicon and crystalline metal in the region of the metal substrate and of the Si layer and crystalline metal of the metal substrate.

A buffer layer may be applied at least on the interface of the silicon layer turned away from the metal substrate.

A further buffer layer may be situated in the region of the second interface between metal substrate and the silicon layer.

An arrangement for rapid thermal treatment and annealing of the anode manufactured according to the method may at least comprise
- at least the high-energy source, e.g. at least one flash lamp, which is directed toward the silicon layer of the anode,
- at least one reflector which is associated with the flash lamp, and which is directed toward the silicon layer of the anode and toward the flash lamp,
- a heating unit, which is associated with the metal substrate and at least heats the metal substrate to a high temperature, preferably between 200° C. and 1000° C., wherein, during the heating, the flash-lamp light is directed toward the interface of the silicon layer turned away from the metal substrate for the transmission of short-time high energy.

The tempering of the region of the second interface of the silicon layer turned away from the metal substrate is performed by means of energy-intensive irradiation, wherein the energy-intensive irradiation is realized on at least one partial area of the turned-away second interface. It is also possible, however, that the entire turned-away second interface of the silicon layer is irradiated and tempered over the entire surface in one irradiation process.

With the method according to the invention, silicon structures, for example, are generated directly on a metal foil and then tempered by means of a rapid thermal processing (the English term, RTP), e.g. flash lamp annealing (the English term, FLA). The improvement from the economic and technical perspective is achieved by the fact that the new invention permits substantially one Si anode material containing an integrated current lead in one material. RTP represents a rapid thermal processing in a high-temperature process, in which a very rapid heating of the silicon layer of the anode is achieved with halogen lamps. The case of a use of flash lamps is known as FLA.

The anode according to the invention, introduced into a process chamber, may be treated/irradiated with several flash lamps, wherein the flash lamps consist of gas discharge lamps, which emit a radiation in the wavelength region between the visible region and infrared region (400 nm-800 nm) and operate with an approximate total power of approximately 12 MW in shorter than 20 ms and are capable of being brought to a temperature of up to 2000° C.

The flash lamp annealing is used to favor the metal-induced layer-exchange process, also known as metal-induced crystallization.

In general, a crystallization of the silicon can first be brought about at approximately 700° C. After a flash lamp annealing, these Si atoms are free atoms and are able to diffuse even at lower temperatures along the grain boundaries of the metal substrate, since at the interface to a metal the covalent bonding of the Si atoms is weakened. This has already been shown and proved to be energetically favorable in several metal/semiconductor systems (e.g. Au/a-Si and Ag/a-Si), as is described in the publication of Z. M. Wang, J. Y. Wang, L. P. H. Jeurgens, E. J. Mittemeijer: Thermodynamics and mechanism of metal-induced crystallization in immiscible alloy systems: Experiments and calculations on Al/a-Ge and Al/a-Si bilayers, Physical Review B 77, 045424 (2008). Beyond this, a crystallization of the silicon can be achieved by the contacting with a metal at relatively low temperature. Very much simplified, the crystalline growth can begin after a drop below the melting temperature, and this can be used as the criterion for the phase transformation. Thus energy and manufacturing costs can be additionally considerably reduced by virtue of the lower processing temperatures.

The invention relates to a method for the manufacture of silicon-based anodes, which in combination with an intercalation cathode, a separator and a liquid/solid electrolyte can be used as anode in a secondary battery containing a mobile species (e.g. lithium, sodium).

The manufacture of the anode takes place by depositing, in a first step, an Si layer on a metal substrate containing grain boundaries.

An additional thin layer may be applied and further considered as a buffer layer, which may also be a metallic, an oxidic, a carbon-containing or a polymer-containing layer.

Then, in a second manufacturing step, a tempering by means of the RTP method, i.e. by means of a rapid thermal processing, e.g. a high-energy irradiation with flash-lamp light, takes place, wherein the lamp arrangement may consist at least of flash lamps and a reflector, wherein heating takes place at least during the tempering of the metal substrate.

Beyond this, manufactured multi-phase Si alloys make additional free spaces available for trapping of the volume change during lithiation and ensure the stabilization of the entire material composite. Since the metallic foils (substrates) being used also simultaneously form the faces of the current leads, the size of which is ultimately decisive for the power of the battery cell, the method according to the invention utilizes the great advantages of the Si nanostructures.

Whereas only a limited number of lithium ions can be stored by intercalation and deintercalation processes, alloys possess a higher storage capacity. One proof of this is the lithium battery development of the Sony Co. named Nexelion, which uses a composite material of cobalt, tin and graphite alloy and has a constant capacity of several hundred cycles. This means an increase of more than 50% is achieved in comparison with conventional graphite anodes.

The innovativeness of the method according to the invention for the manufacture of high-capacity silicon-based anodes for secondary batteries consists in depositing the Si structures directly on a metallic foil and then tempering them. In the process, multi-phase silicon-metal structures are formed, which absorb the volume change due to delithiation and lithiation and ensure the stabilization of the entire material composite. The method has good scalability and a complete integratability into roll-to-roll technology. In this respect, the method for manufacture of Si anodes with an integrated current lead from an electrically conductive material represents a special feature of the invention. This also permits a considerable reduction of the resources and energy used as well as of the manufacturing time and costs.

BRIEF DESCRIPTION OF THE DRAWINGS

The invention will be explained in more detail by means of an exemplary embodiment on the basis of drawings, wherein:

FIG. 1 shows a schematic diagram of a metal-silicon anode according to the invention, wherein
FIG. 3 shows a model description of the growth front after a flash lamp annealing from a longitudinal-section view and a surface overhead view: metal layer (metal foil)-deposited Si layer, wherein
FIG. 4 shows the chemical composition, determined with a measurement, of the Ni—Si phases on the surface of the Ni—Si anode after a flash lamp annealing, wherein

DETAILED DESCRIPTION OF THE PREFERRED EMBODIMENTS

Figure 1A:
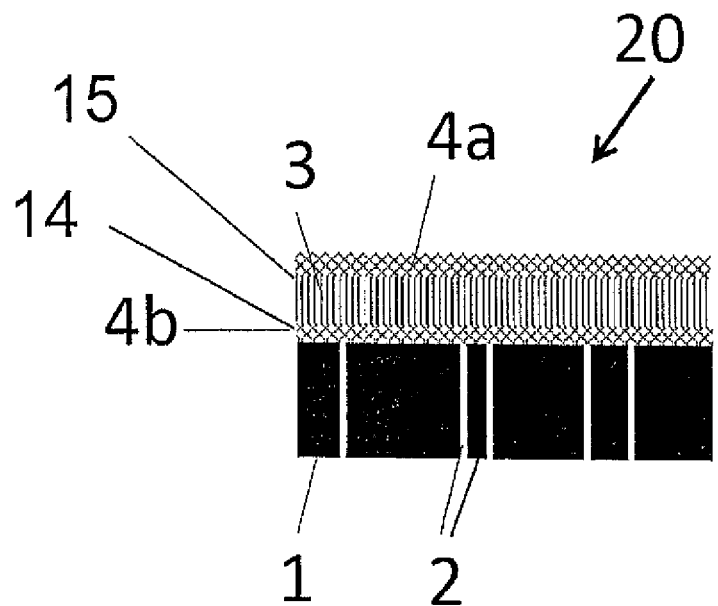
FIG. 1a shows the anode and
FIG. 1b shows a treatment step of the energy-intensive irradiation of the anode according to FIG. 1a emitted by an energy source in the form of a flash-lamp arrangement and a step of heating of the metal substrate performed simultaneously during the treatment step.

In the following, an exemplary embodiment of the method for the manufacture of a silicon-based anode 20 for secondary batteries by means of flash lamp annealing as a form of a short intensive energy transfer from an arrangement 21 of flash lamps onto the free interface of the anode 20 (second interface 15 of silicon layer 3) according to the invention is explained in more detail by joint consideration of FIG. 1, FIG. 1a and FIG. 1b as well as FIG. 3a and FIG. 3b.

The method for the manufacture of a silicon-based anode 20 for secondary batteries 30, wherein the secondary batteries 30 consist at least of the anode 20, of at least one electrolyte 31a, 31b, a separator 32, which is situated between the electrolytes 31a and 31b, and a counter-electrode 33 according to FIG. 5, comprises, according to the invention, the following steps:
depositing a silicon layer 3 on a metal substrate 1 containing grain boundaries 2, wherein a first interface 14 is present between silicon layer 3 and the metal substrate 1,
heating the metal substrate 1 by means of a heating unit 22 to a temperature between 200° C. and 1000° C.,
tempering the region of the second interface 15 of the silicon layer 3 turned away from the metal substrate 1 by means of an energy-intensive irradiation while the metal substrate 1 is being heated,
generating multiple phases 10, 11 in the region of the silicon layer 3 and of the metal substrate 1, consisting of amorphous silicon and/or crystalline silicon of the silicon of the silicon layer 3 and of crystalline metal of the metal substrate 1 and of silicide, and
generating crystalline metal 8 of the metal substrate 1.

An additional buffer layer 4a, 4b in the form of a metallic, oxidic, carbon-containing or polymer-containing layer may be introduced at the first Si-layer interface 14 to the metal substrate 1 and/or at the second Si-layer interface 15 directed toward the electrolyte 31b.

The tempering is performed by means of an arrangement 21 for rapid thermal treatment and annealing.

The metal substrate 1 also functions as an integrated current lead in the anode 20 according to the invention.

Nickel or copper is preferably used as the metal of the metal substrate 1.

The energy-intensive irradiation for annealing may be performed at least with a flash lamp 6, which is constructed as the energy source and which can have a flash duration between 0.2 ms and 20 ms and an energy density of 0.6 $J/cm^2$ and 160 $J/cm^2$.

According to the invention, the silicon-based anode 20, manufactured according to the aforesaid method, may at least comprise
a metal substrate 1, functioning as carrier material and as current lead,
a silicon layer 3 applied on the metal substrate 1, wherein a first interface 14 is formed between the silicon layer 3 and the metal substrate 1,
at least one buffer layer 4a applied on the second interface 15 of the silicon layer 3 turned away from the metal substrate 1,
multiple phases 10, 11 of amorphous silicon, crystalline silicon and crystalline metal in the region of the metal substrate 1 and of the Si layer 3 and
crystalline metal 8 of the metal substrate 1.

A further second buffer layer 4b may be situated in the region of the first interface 14 between metal substrate 1 and the silicon layer 3.

Figure 1B:
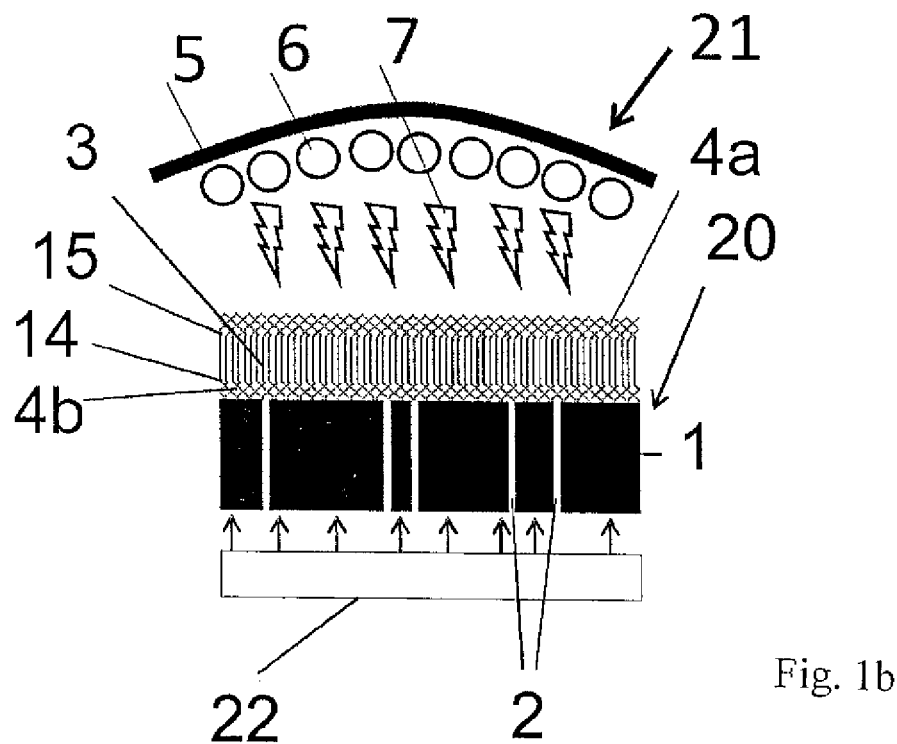

For this purpose, an Si layer 3 (layer thickness 2.2 μm) according to FIG. 1, FIG. 1a is deposited by means of CVD on a metal foil (Ni, layer thickness 100 μm) formed as metal substrate 1 and then tempered by means of a flash lamp annealing (with a flash duration between 0.2 ms and 20 ms) according to FIG. 1b. Before and during the high-energy-intensive treatment of the silicon layer 3, the metal substrate 1 is heated.

FIG. 1b shows a schematic diagram of an arrangement 21 for rapid thermal treatment and annealing, wherein the arrangement 21 at least comprises
at least the energy-intensive energy source 6, which is directed toward the silicon layer 3 of the anode 20,
a heating unit 22, which is associated with the metal substrate 1 and which heats the metal substrate 1 and the silicon layer 3 to a temperature between 200° C. and 1000° C.,
wherein, during the heating, the energy source 6 is directed toward the second interface 15 of the silicon layer 3 turned away from the metal substrate 1 for the transmission of short-time high energy.

The energy-intensive energy source 6 in FIG. 1b may at least comprise at least the flash lamp, which is directed toward the second interface 15 of the silicon layer 3 of the anode 20, as the energy-intensive energy source 6, and at least one reflector 5 associated with the flash lamp 6, wherein the irradiating light 7 is directed toward the silicon layer 3, wherein, during the heating, the irradiating light 7 is directed toward the second interface 15 of the silicon layer 3 turned away from the metal substrate 1 for the transmission of short-time high energy.

Figure 2:
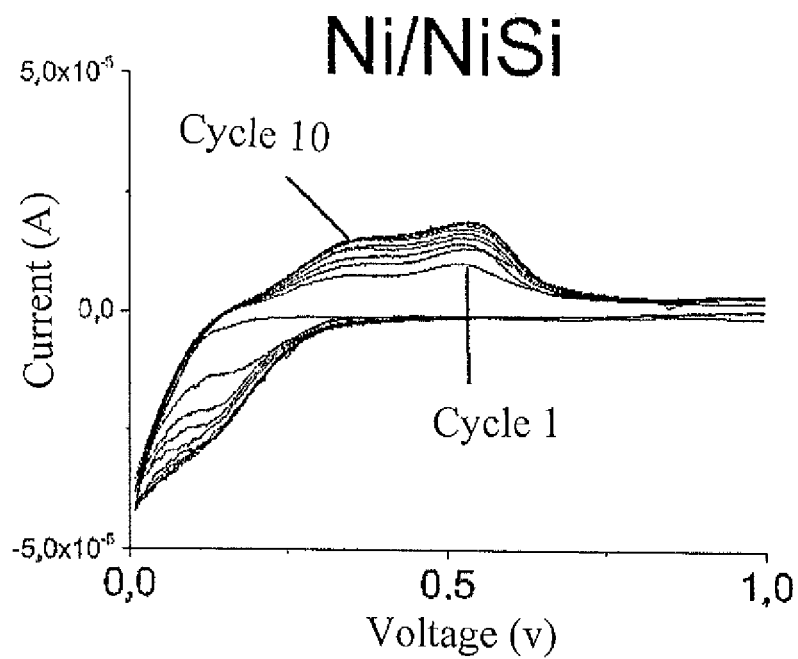
FIG. 2 shows a cyclic voltammogram (CV) in the form of current(I)-voltage(V) curves in a half-cell/secondary battery consisting of an Ni/NiSi anode, of an electrolyte provided with a separator and of a counter electrode.

An electrochemical characterization by means of cyclic voltammetry (the English term, CV) of a battery button cell from an amorphous nanostructured alloy with Si anode material and with the Ni/NiSi material system versus a liquid electrolyte, e.g. 1 mol LiTFSI in dimethoxyethane/dioxolane mixture (1:1 vol.) and a reference electrode, e.g. a lithium electrode, is shown in FIG. 2.

FIG. 2 shows a cyclic voltammogram (CV) in the form of current(I)-voltage(V) curves in a half-cell, formed as a secondary battery, from an Ni—NiSi anode, from a liquid electrolyte and the counter electrode at a constant charging/discharging voltage of 20 μv/s. The CV or IV measurement is performed at a constant charging/discharging voltage of 20 μv/s. It is evident that the silicon undergoes a lithiation in the first cycle and is then delithiated again during the charging. In total, ten cycles were performed at the same charging/discharging voltage of 20 μv/s in FIG. 2. Delithiation/lithiation is to be understood as deintercalation and intercalation respectively of the lithium ions in the host material, e.g. Si alloy.

Figure 3A:
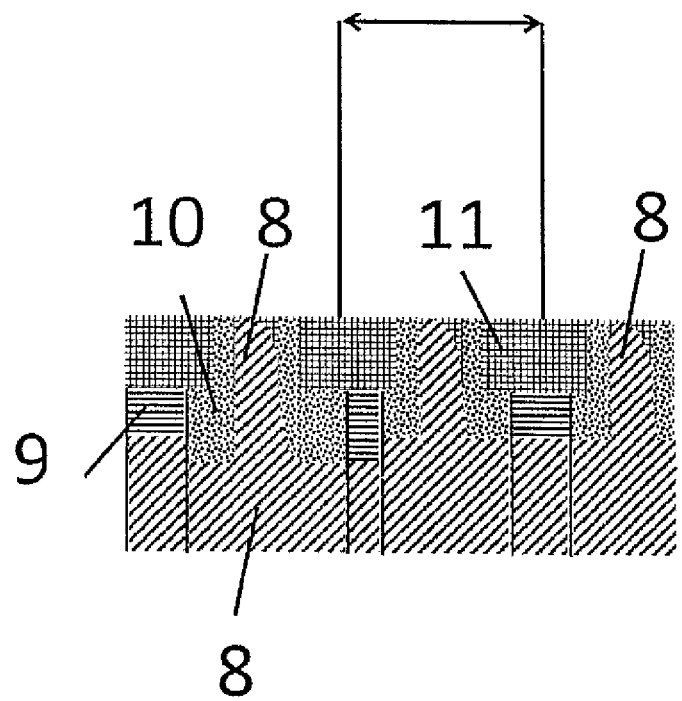
FIG. 3a shows the longitudinal section through the annealed anode with several multiple phases and crystalline metal
Figure 3B:
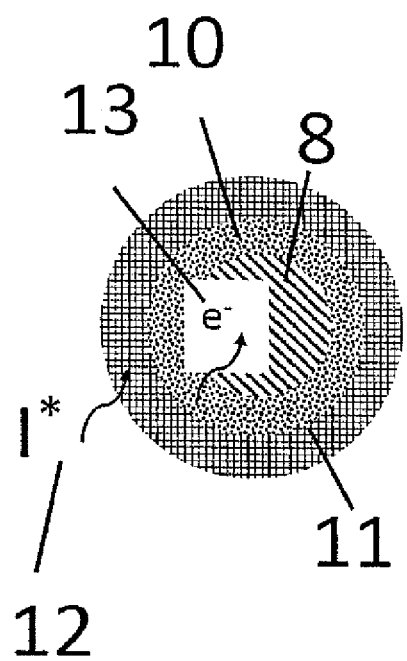
FIG. 3b shows the overhead view of the annealed anode with several multiple phases and crystalline metal.

FIG. 3, FIG. 3a shows a longitudinal section through the anode 20 according to the invention with a model description, derived from the morphological investigation, of the growth front after the flash lamp annealing of an Si layer 3 deposited on the Ni foil 1. It leads to a diffusion of the Si atoms along the grain boundaries 2 occurring in the metal substrate 1 and to formation of a crystalline c-Si layer 9. Further multiple phases 10 of a-Si+c-Ni (amorphous silicon and crystalline nickel) or multiple phases 11 of a-Si+c-Si+c-Ni crystalline (amorphous silicon and crystalline silicon and crystalline nickel) are formed in crystalline form. FIG. 3b shows an overhead view of the anode 20 manufactured with RTP, wherein not only the multiple phases 10 and multiple phases 11 but also ions I$^+$ of the mobile species 12 and free electrons 13 e$^-$ are present.

FIG. 4 shows, relative to FIG. 3b, a model description, likewise obtained from the morphological investigations, of the generated structures on the Ni-NiSi surface after the flash lamp annealing and their chemical compositions by means of a method of energy-dispersive x-ray spectroscopy. The resulting Ni phases and Si phases of the structures described in FIGS. 3, 3a and 3b are clearly indicated from the energy-dispersive x-ray spectroscopy.

Figure 4A:
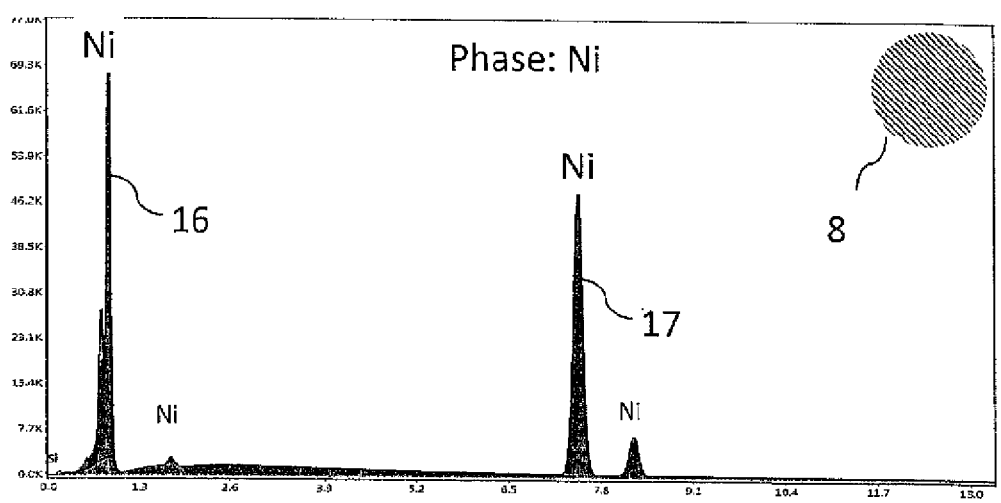
FIG. 4a shows a crystalline metal layer according to FIG. 3, characterized with energy-dispersive x-ray spectroscopy.
Figure 4B:
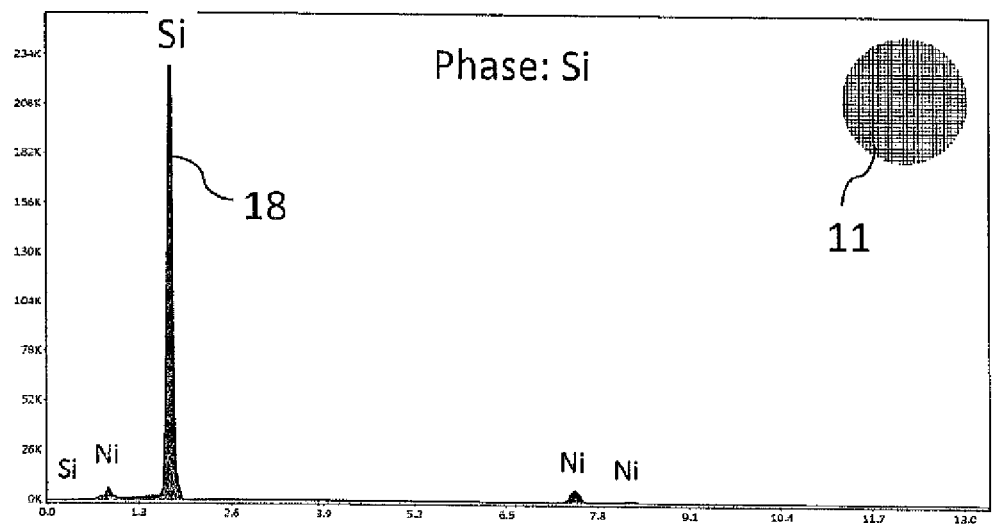
FIG. 4b shows a crystalline silicon layer according to FIG. 3, characterized with energy-dispersive x-ray spectroscopy.
Figure 4C:
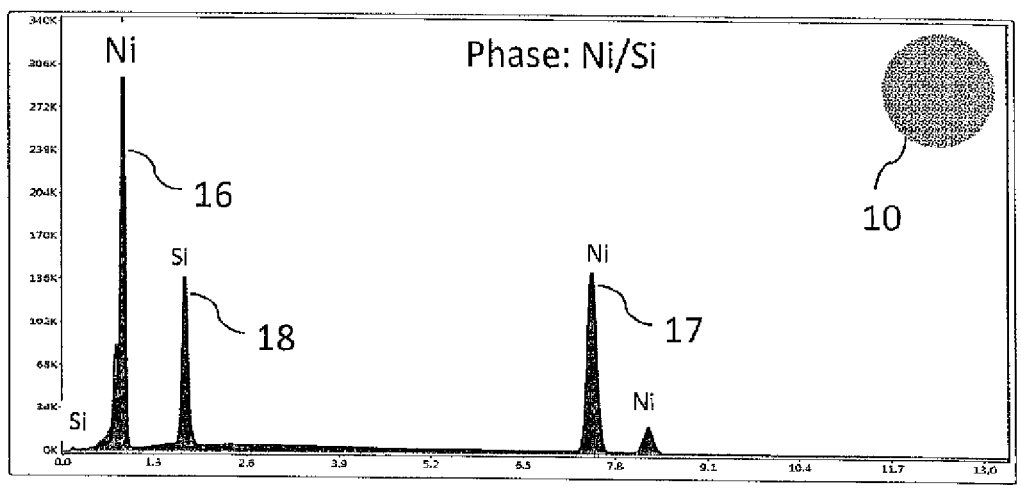
FIG. 4c shows a crystalline combination of the crystalline metal layer and of the crystalline silicon layer according to FIG. 3, characterized with energy-dispersive x-ray spectroscopy.

FIG. 4a shows the x-ray spectroscopic result of the crystalline nickel surface of the nickel layer 8 with nickel signal amplitudes 16 and 17, FIG. 4b shows the x-ray spectroscopic result of the crystalline surface of the multiple phase 11 with silicon signal amplitudes 18 and FIG. 4c shows the x-ray spectroscopic result of the crystalline surface of the multiple phase 10 with nickel signal amplitudes 16 and 17 and silicon signal amplitude 18.

Figure 5A:
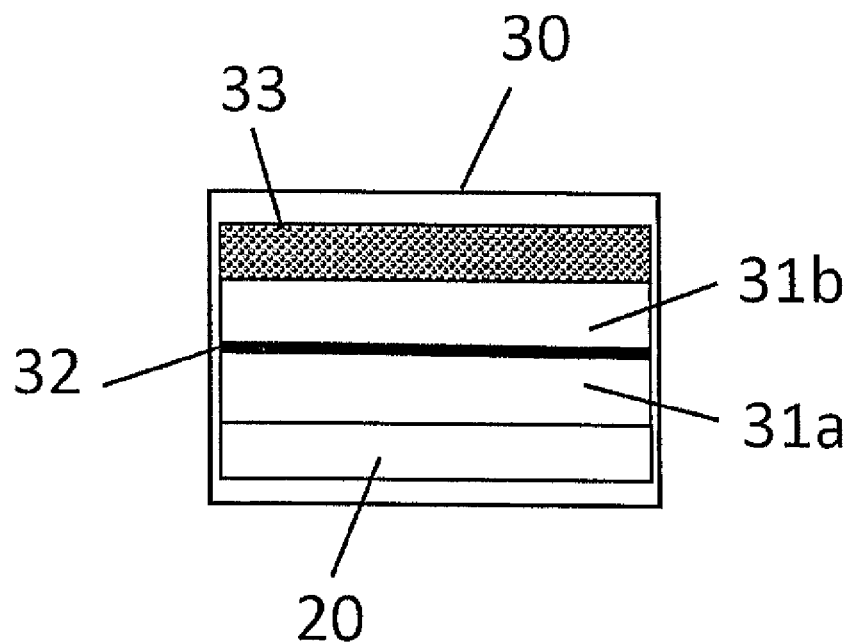
FIG. 5 shows a schematic longitudinal section through the main battery components of a secondary battery with anode according to the invention, wherein FIG. 5a schematically illustrates the secondary battery with the components present therein disposed in layers and FIG. 5b the schematically illustrated layered arrangement of the components: cathode, first electrolyte, separator, second electrolyte, anode with an insulation layer applied on the layered rim and with a metal housing jacket applied on the insulation layer, wherein a load is connected to anode and cathode.
Figure 5B:
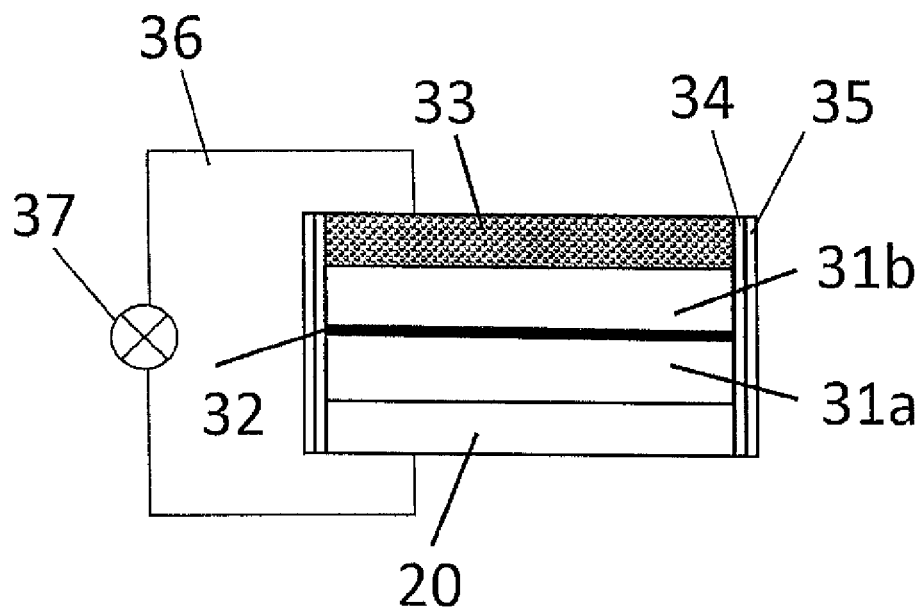

FIG. 5 shows a schematic diagram of a secondary battery 30, consisting at least of the components
  a cathode 33,
  a first electrolyte 31b,
  a separator 32,
  a second electrolyte 31a,
  the anode 20 according to the invention, wherein the anode 20 according to the invention is arranged after the second electrolyte 31a, and wherein the components 33, 31b, 32, 31a, 20 are combined in layered manner in the said order within the secondary battery 30, as shown in FIG. 5a and in FIG. 5b.

In FIG. 5a, the secondary battery 30 is illustrated together with the components 33, 31b, 32, 31a, 20 present therein disposed in layers.

In FIG. 5b, the schematically illustrated layered arrangement of the components possesses: cathode 33, first electrolyte 31b, separator 32, second electrolyte 31a, anode 20 on the layered rim with an insulation layer 34 applied thereon and a metal housing jacket 35 applied on the insulation layer 34. The anode 20 and the cathode 33 are respectively connected with load-current lines 36, to which the at least one load 37 is connected.

The following advantages exist:

The Si layers 3, on which the method according to the invention is based, are chemically stable, inexpensive as well as less time and energy consuming than the Si layers described in the publication WO 2012158608 A1.

The buffer layer 4a, which is associated with the Si layer 3 and on which the Si layer 3 is deposited and which is disposed opposite the metal foil 1, is not present on the current-lead side and therefore cannot impair the electrical conductivity, which determines the power of the anode 20.

The Si layer 3, on which the method according to the invention is based, is deposited directly on the metal substrate 1. This process makes use of a metal-induced layer exchange process, due to the rapid thermal treatment according to FIG. 1b, between the metal layer 1 and the silicon layer 3. The metallic substrate 1 is considered to be an integrated current lead, in contrast to the current lead for the anode in the publication US 2014/0370386 A1.

By roll-to-roll technology, the following is understood:

By means of a roll-to-roll technology, both the deposition of the silicon layer 3 on the metal substrate 1 and the deposition of the buffer layers 4a and/or 4b as well as the thermal treatment and annealing can be performed on a metal substrate 1, which is situated on a roll, unrolled, coated, heated and processed as well as finally rolled up once again. The needed anode 20 is then taken from the roll.

LIST OF REFERENCE SYMBOLS

1 Metal substrate
2 Grain boundary
3 Si layer
4a First metallic/oxidic/carbon-containing/polymer-containing buffer layer
4b Second metallic/oxidic/carbon-containing/polymer-containing buffer layer
5 Reflector
6 Energy-intensive energy source
7 Irradiating light
8 Crystalline metal layer(c-Me)
9 Crystalline Si layer(c-Si)
10 Multi-phase layer of c-Me, c-Si
11 Multi-phase layer of c-Me, c-Si and amorphous Si (a-Si)
12 Ion of the mobile species, e.g. Li+
13 Free electrons
14 First interface
15 Second interface
16 First nickel signal amplitude
17 Second nickel signal amplitude 18 Silicon signal amplitude
20 Anode according to the invention
21 Arrangement for energy-intensive treatment/lamp arrangement
22 Heating unit
30 Secondary battery of the anode according to the invention, two electrolytes, a separator situated between the two electrolytes and a cathode
31a Second electrolyte
31b First electrolyte
32 Separator
33 Cathode
34 Insulation layer
35 Metal housing jacket
36 Load current lines
37 Load

The invention claimed is:

1. A method for the manufacture of silicon-based anodes for secondary batteries (30), wherein the secondary batteries (30) comprise at least the anode, at least one electrolyte (31a, 31b) and a counter-electrode (33), comprising the following steps:
   depositing a silicon layer (3) on a metal substrate (1), wherein the silicon layer (3) has a first interface (14) directed toward the metal substrate (1),
   heating the metal substrate (1) by means of a heating unit (22) to a temperature between 200° C. and 1000° C., wherein the heating unit (22) is associated with the metal substrate (1) and is directed toward the metal substrate (1),
   tempering the region of a second interface (15) of the silicon layer (3) turned away from the metal substrate (1) by means of an energy-intensive irradiation during the heating,
   generating multiple phases (10, 11) in the region of the silicon layer (3) and of the metal substrate (1), comprising amorphous silicon of the silicon layer (3) and crystalline metal of the metal substrate (1) and
   generating crystalline metal (8) of the metal substrate (1), wherein the anode at least comprises
      the metal substrate (1), functioning as carrier material and as current lead,
      a silicon layer (3) deposited on the metal substrate (1), with a formation of the first interface (14) to the metal substrate (1),
      generating multiple phases (10, 11) in the region of the silicon layer (3) and of the metal substrate (1), comprising amorphous silicon of the silicon layer and crystalline metal of the metal substrate and silicide,
   wherein the flash lamps comprise gas discharge lamps, which emit a radiation in the wavelength region between 400 nm-800 nm and a flash duration between 0.2 ms and 20 ms to a temperature of up to 2000° C.

2. The method according to claim 1, wherein a buffer layer (4a, 4b) in the form of a metallic, oxidic, carbon-containing or polymer-containing layer is respectively introduced at the first Si-layer interface (14) to the metal substrate (1) and/or at the second Si-layer interface (15) directed toward the electrolyte (31b).

3. The method according to claim 1, wherein the tempering is performed by means of an arrangement (21) for rapid energy-intensive thermal treatment and annealing.

4. The method according to claim 1, wherein the metal substrate (1) functions as an integrated current lead.

5. The method according to claim 4, wherein nickel or copper is used as the metal of the metal substrate (1).

6. The method according to claim 3, further comprising introducing a first buffer layer (4a) at the first Si-layer interface (14) to the metal substrate (1) and a second buffer layer (4b) at the second Si-layer interface (15) directed toward the electrolyte (31b);
   wherein each of the first buffer layer and the second buffer layer is in the form of a metallic, oxidic, carbon-containing or polymer-containing layer;
   wherein both the deposition of the silicon layer on the metal substrate and the first and second buffer layers and/or as well as the thermal treatment and the annealing are performed on the metal substrate, which is situated on a roll, unrolled, coated, heated and processed as well as finally rolled up in the roll once again.

* * * * *